United States Patent [19]
Smith

[11] Patent Number: 5,463,865
[45] Date of Patent: Nov. 7, 1995

[54] STARTER AIR VALVE POSITION PRESSURE TRANSDUCER

[75] Inventor: Alan W. Smith, Cincinnati, Ohio

[73] Assignee: General Electric Company, Cincinnati, Ohio

[21] Appl. No.: 129,538

[22] Filed: Sep. 30, 1993

[51] Int. Cl.$^6$ ............................................. F02C 7/27
[52] U.S. Cl. ...................... 60/39.142; 60/39.33; 60/409; 415/118
[58] Field of Search .................. 60/39.142, 39.183, 60/39.33, 409, 410, 411; 73/861.52, 861.53, 861.54, 861.55, 861.56, 861.61, 861.62, 861.63; 137/488, 489; 415/29, 49, 118; 454/71, 72, 73, 74; 251/305

[56] References Cited

U.S. PATENT DOCUMENTS

| | | | |
|---|---|---|---|
| 2,840,987 | 7/1958 | Bloomberg et al. | 60/39.142 |
| 3,059,660 | 10/1962 | Dantowitz | 415/118 |
| 3,444,875 | 5/1969 | Furlong et al. | 415/49 |
| 3,769,998 | 11/1973 | Avant | 137/489 |
| 3,795,145 | 3/1974 | Miller | 73/186.53 |
| 4,006,634 | 2/1977 | Billette et al. | 73/861.53 |

Primary Examiner—Louis J. Casaregola
Attorney, Agent, or Firm—Andrew C. Hess; Patrick R. Scanlon

[57] ABSTRACT

A pressure transducer adapted to measure the position of a pneumatic valve by measuring pressure immediately downstream of a valve restrictor (e.g. a valve plate or butterfly plate) and comparing that pressure with a pressure measured at a second measurement port.

9 Claims, 3 Drawing Sheets

STARTER AIR VALVE POSITION PRESSURE TRANSDUCER

The present invention relates, in general, to a starting system for gas turbine engines and, more particularly, to an improved starting system for a gas turbine engine including an air valve position pressure transducer.

BACKGROUND OF THE INVENTION

Gas turbine engines are started using air turbine starters which receive pressurized air from, for example, a separate air compressor or from the auxiliary power unit of an aircraft. Air flow to the starter is generally controlled by a starter valve which acts as an on/off valve, restricting flow to the starter. In prior art systems, the position of the starter valve has been measured using, for example, electrical switches connected to the actuator mechanism which controls the position of the valve plate. However, using switches to determine the status of a valve provides limited information about failures. Further, electrical switches actuated mechanically are difficult to test without removing the switch and testing it separately because such systems generally cannot distinguish between switch failures and valve failures.

It would, therefore be advantageous to design a valve position sensing system which is reliable and testable. Further, it would be advantageous to design a valve position sensor which provides information on the air pressure at the input to the starter.

SUMMARY OF THE INVENTION

The invention comprises a pressure transducer adapted to measure the position of a pneumatic valve by measuring pressure immediately downstream of a valve restrictor (e.g. a valve plate or butterfly plate) and comparing that pressure with a pressure measured at a second point further downstream. More particularly, the present invention comprises a pressure measurement system comprising a supply duct including an air valve with a flow restrictor adapted to close the supply duct and a measurement port (e.g. a pressure tap) immediately downstream of the flow restrictor. The invention further comprises a pressure transducer adapted to compare the pressure at the measurement port to a second pressure (e.g. ambient pressure) and produce a signal which is indicative of the pressure drop across the whole system.

In one embodiment of the present invention, a pneumatic starter is connected downstream of the measurement port and includes an exhaust port. In this embodiment, the second pressure is the air pressure measured at the exhaust port.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

Figure 1:
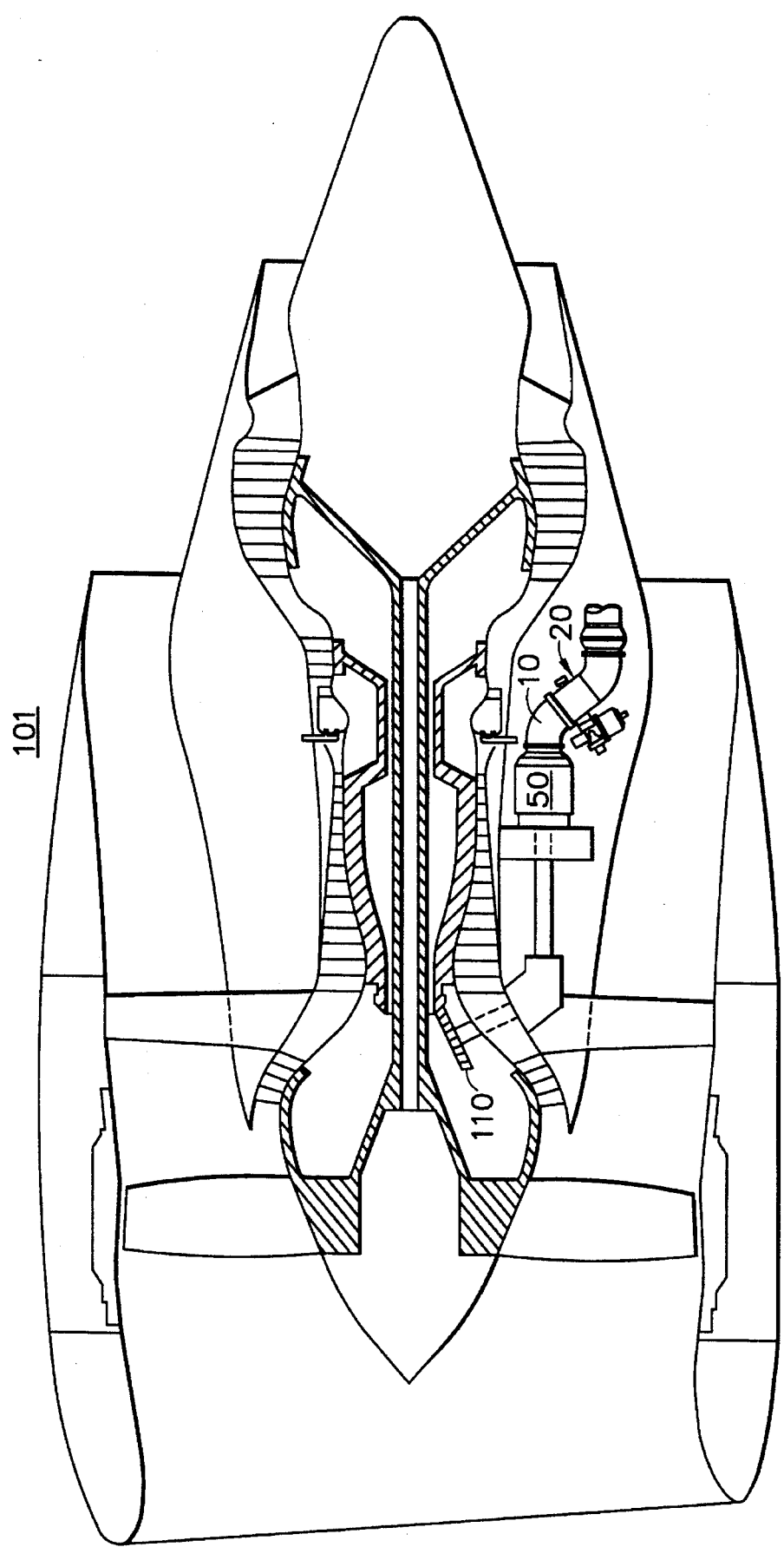
FIG. 1 illustrates a gas turbine engine including pneumatic starter and a starter air valve.

In FIG. 1, gas turbine engine 101 includes a starter turbine 50 adapted to start turbine 101 by, for example, turning gear 110. Starter turbine 50 is turned by air supplied through duct 10. The air pressure in duct 10 is regulated by starter air valve 20 which may be opened to supply air to starter turbine 50. The pressurized air regulated by starter valve 20 may be supplied by, for example, a compressor.

Figure 2:
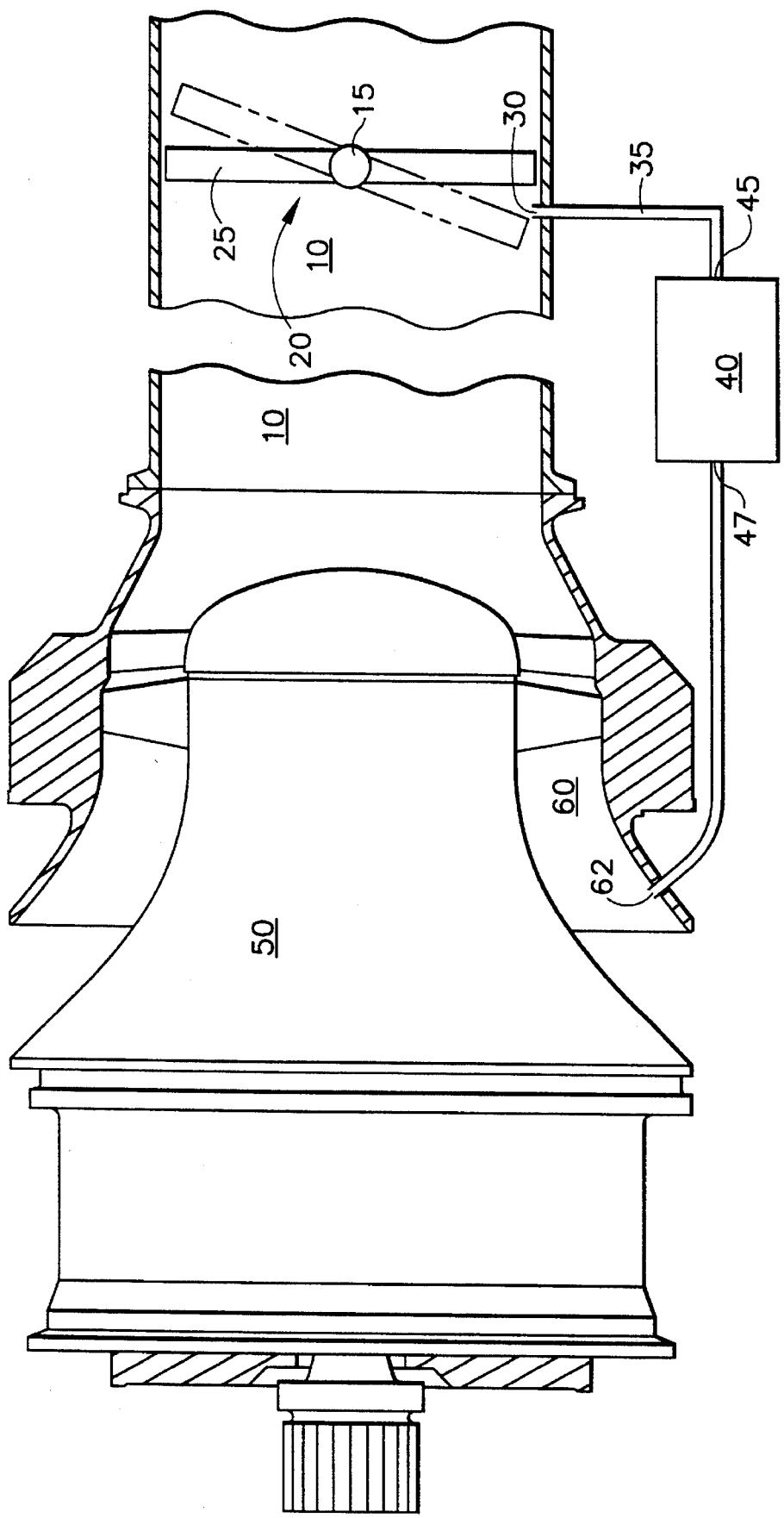
FIG. 2 illustrates a starter system for a gas turbine engine including a starter air valve according to the present invention.

In the embodiment illustrated in FIG. 2, starter turbine 50 receives compressed air through supply duct 10. The compressed air is used to turn turbine 50 which may be used, for example, to start a gas turbine engine. Airflow to the starter is controlled by starter air valve 20 which includes restrictor mechanism 25 which may be, for example, a throttle plate or butterfly plate. Measurement port 30, which may be, for example, an opening in duct 10 or a pressure tap, is located downstream from valve 20. A first input 45 of Pressure transducer 40 is connected to measurement port 30 by a measurement tube 35. Pressure transducer 40 compares the pressure at measurement port 30 to a reference pressure at a second input 47. The reference pressure at second input 47 may be, for example, ambient pressure. Alternatively, the pressure at second input 47 may be the pressure measured at a pressure tap 62 located at exhaust port 60 of starter air turbine 50.

In the embodiment of FIG. 2, air which flows through valve 20 to starter 50 is exhausted through exhaust port 60. Flow to starter 50 is controlled by the position of restrictor 25. Therefore, when restrictor 25 is closed, no air flows to turbine 50 and the pressure at measurement port 30 is substantially equal to the pressure at exhaust 60. When restrictor 25 is opened, compressed air flows through starter 50 and out exhaust port 60. The pressure drop in the starter is measured by pressure transducer 40 which compares the pressure at measurement port 30 to the pressure at second input 47 which may be connected directly to measurement port 62 located at exhaust port 60.

The Starter air valve (SAV) feedback system illustrated in FIG. 2 may be used to detect failures in air valve 20 and to prevent such failures from damaging starter 50 or any other downstream components. For, example, if restrictor 25 is stuck fully or partially open, leakage through valve 20 may be adequate to turn and damage starter 50. In addition, by providing an indication of the pressure drop across starter 50, the present invention may be used to isolate failures in valve 20.

As illustrated in FIG. 2, in one embodiment of the present invention valve 20 may be a butterfly valve opened and closed by an actuator connected to shaft 15 external to duct 10. Alternatively, an electric solenoid may be arranged to hold restrictor mechanism 25 closed. When the solenoid is actuated, the air pressure upstream opens the valve. In this embodiment, the restrictor mechanism is connected to a spring which holds the restrictor 25 closed until the upstream air reaches a sufficient pressure to overcome the counter pressure of the spring. If the upstream air pressure drops below the pressure necessary to overcome the spring force, restrictor 25 closes and may be held closed by the solenoid. Spring loading restrictor 25 closed also provides a fail-safe condition for the valve, preventing unwanted flow to starter 50.

When valve 20 is partially open, the majority of the pressure drop is developed across valve 20. Pressure transducer 40 measures this drop once restrictor 25 is open enough to expose measurement port 30. When valve 20 is fully open, the majority of the pressure drop is developed across starter 50. In intermediate valve positions the pressure drop is developed across both valve 20 and the starter 50. Therefore, measurement port 30 must be located such that transducer 40 senses the total pressure drop of the valve and starter nozzle, which is the difference between the supply air pressure and the starter exhaust pressure. Therefore, the position of measurement port 30 and its relationship with the movement of restrictor 25 is critical to ensure that transducer 40 will sense the change in pressure differential from zero to inlet gauge pressure at the appropriate valve position.

By comparing the pressure at measurement port 30 with the pressure at second inlet 47, the present invention provides a mechanism for indicating the position of restrictor 25 and for measuring the pressure differential across starter 50.

Measurement port 30 is located such that the pressure measured at port 30 is the pressure downstream of restrictor 25 when restrictor 25 is fully closed. When valve 20 is partially open, the pressure at port 30 is the pressure upstream of restrictor 25. Therefore, when valve 20 opens, the pressure differential measured by pressure transducer 40 increases. If valve 20 fails open or partially open, pressure transducer 40 will also measure an increase in the pressure differential as a result of leakage. Thus, failures of valve 20 may be detected by monitoring the pressure differential measured by pressure transducer 40.

Figure 3:
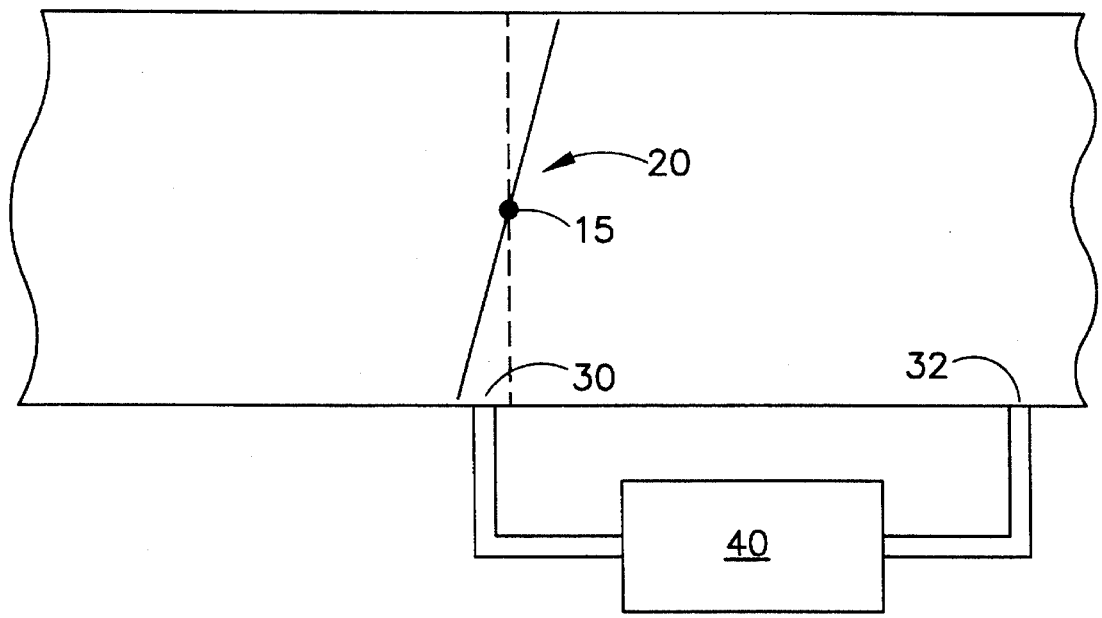
FIG. 3 illustrates an embodiment of the present invention.

In the embodiment of FIG. 3, pressure transducer 40 is positioned such that the pressure at measurement port 30 is compared to a second pressure at a measurement port 32, upstream of measurement port 32. therefore, when starter air valve 20 is closed, the pressure measured at measurement port 32 substantially exceeds the pressure measured at measurement port 30. However, when starter valve 20 is opened, the pressure at measurement port 32 should be substantially equal to the pressure at measurement port 30.

Figure 4:
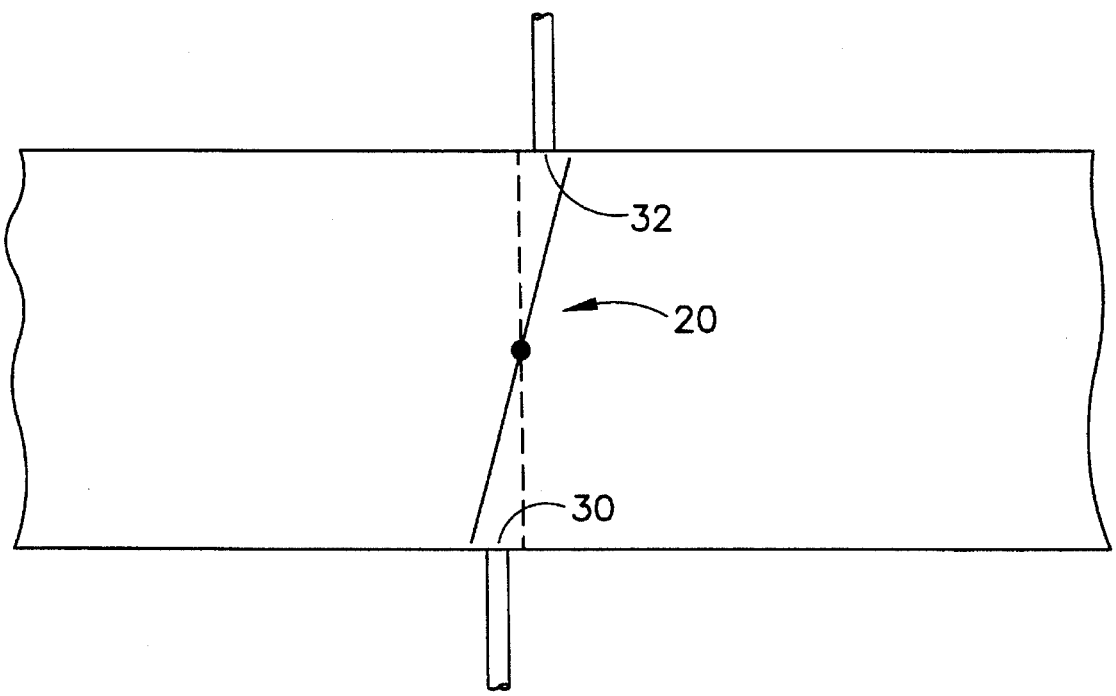
FIG. 4 illustrates a further embodiment of the present invention.

In the embodiment of FIG. 4, measurement port 32 is positioned immediately upstream of starter air valve 20 and measurement port 32 is positioned immediately downstream of starter air valve 20. Thus, when starter air valve 20 is closed, the pressure at measurement port 30 is substantially greater than the pressure at measurement port 30. However, when starter air valve 20 is opened slightly, as illustrated in FIG. 4, the pressure at measurement port 30 is substantially greater than the pressure at measurement port 32. Finally, when starter air valve 20 is fully open, the pressure at measurement port 32 is substantially equal to the pressure at measurement port 30.

A pressure sensor according to the present invention may also be used to sense the absence of supply pressure. When there is no air supply pressure, the transducer will sense no delta pressure with valve 20 open. In a further advantage of the present invention, transducer 40 provides an indication of whether sufficient supply pressure is available for an assisted start attempt as soon as the valve opens enough to expose measurement port 30. A measurement system according to the present invention can be used to measure the starter output torque and power since the differential pressure across starter 50 is related to output torque and power. These calculated values may, in turn, be used to predict the engine acceleration rate, start time and EGT.

Further, according to the present invention, starter air valve binding or sticking in the partially open position can be identified from calculations of starter air supply pressure as a function of engine acceleration rate and fuel flow.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

We claim:

1. A pressure measurement system comprising:

a supply duct;

an air valve, including a restrictor mechanism adapted to close said supply duct;

a first measurement port at a first location such that a first pressure measured at said first measurement port when said restrictor mechanism is in a fully closed position is a pressure downstream of said restrictor mechanism and such that a second pressure measured at said first measurement port when said valve is at least partially opened is a pressure upstream of said restrictor mechanism;

a pneumaticly operated starter connected to said supply duct downstream of said first measurement port and including an exhaust port in fluid communication with said supply duct; and a pressure transducer including an input from said first measurement port and an input from a second measurement port located at a second location at said exhaust port.

2. A pressure measurement system as claimed in claim 1 wherein said restrictor mechanism comprises a plate pivotably disposed within said supply duct.

3. A pressure measurement system as claimed in claim 2 wherein said plate has an outer edge that passes by said first measurement port when said restrictor mechanism is at least partially opened.

4. A pressure measurement system comprising:

an air valve disposed in a supply duct, said air valve including a restrictor mechanism adapted to close said supply duct, a first measurement port at a first location such that a first pressure measured at said first measurement port when said restrictor mechanism is in a fully closed position is a pressure downstream of said restrictor mechanism and such that a second pressure measured at said first measurement port when said valve is at least partially opened is a pressure upstream of said restrictor mechanism and a pressure transducer including an input from said first measurement port and an input from a second measurement port located at a second location, said pressure transducer adapted to measure pressure differences between said measurement ports.

5. A pressure measurement system as claimed in claim 4 wherein said restrictor mechanism comprises a plate pivotably disposed within said supply duct.

6. A pressure measurement system as claimed in claim 5 wherein said plate has an outer edge that passes by said first measurement port when said restrictor mechanism is at least partially opened.

7. A gas turbine engine starting system comprising:

a gas turbine engine mechanically connected to an air powered starter turbine at the receiving end of an air supply duct;

an air valve, including a restrictor mechanism adapted to close said supply duct;

a first measurement port at a first location such that a first pressure measured at said first measurement port when said restrictor mechanism is in a fully closed position is a pressure downstream of said restrictor mechanism and such that a second pressure measured at said first measurement port when said valve is at least partially opened is a pressure upstream of said restrictor mechanism;

a pneumaticly operated starter connected to said supply duct downstream of said first measurement port and including an exhaust port in fluid communication with said supply duct; and a pressure transducer including an input from said first measurement port and an input from a second measurement port located at a second location at said exhaust port.

8. A gas turbine engine starting system as claimed in claim 7 wherein said restrictor mechanism comprises a plate pivotably disposed within said supply duct.

9. A gas turbine engine starting system as claimed in claim 8 wherein said plate has an outer edge that passes by said first measurement port when said restrictor mechanism is at least partially opened.

* * * * *